United States Patent
Jeong et al.

(10) Patent No.: US 8,107,416 B2
(45) Date of Patent: Jan. 31, 2012

(54) METHOD AND APPARATUS FOR RADIO CONNECTION SETUP IN A MOBILE COMMUNICATION SYSTEM

(75) Inventors: Kyeong-In Jeong, Hwaseong-si (KR); O-Sok Song, Suwon-si (KR); Sung-Ho Choi, Suwon-si (KR); Gert-Jan Van Lieshout, Middlesex (GB); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 880 days.

(21) Appl. No.: 11/789,711

(22) Filed: Apr. 25, 2007

(65) Prior Publication Data
US 2007/0287476 A1 Dec. 13, 2007

(30) Foreign Application Priority Data
Apr. 25, 2006 (KR) .................. 10-2006-0037153

(51) Int. Cl.
*H04W 4/00* (2009.01)
(52) U.S. Cl. .................... 370/328; 370/310.2
(58) Field of Classification Search .... 455/456.1–456.6, 455/428, 433, 422.1, 450, 404.2, 414.2, 432.1, 455/462.3, 435.1–435.3, 436–442, 451, 452.1, 455/455; 370/310.2, 328, 338, 329–331
See application file for complete search history.

(56) References Cited

U.S. PATENT DOCUMENTS

| | | | |
|---|---|---|---|
| 7,376,430 B2 * | 5/2008 | Matsuda | 455/456.2 |
| 2002/0147024 A1 | 10/2002 | Wan | |
| 2002/0187749 A1 | 12/2002 | Beasley et al. | |
| 2003/0050016 A1 | 3/2003 | Boros et al. | |
| 2003/0224803 A1 * | 12/2003 | Konno | 455/456.1 |
| 2003/0236096 A1 | 12/2003 | Yamazaki | |
| 2004/0082356 A1 | 4/2004 | Walton et al. | |
| 2004/0095891 A1 * | 5/2004 | Nakagawa | 370/252 |
| 2004/0185870 A1 * | 9/2004 | Matsuda | 455/456.1 |
| 2004/0229629 A1 * | 11/2004 | Yi et al. | 455/452.2 |
| 2004/0248568 A1 | 12/2004 | Lucidarme | |
| 2005/0181799 A1 | 8/2005 | Laroia et al. | |
| 2005/0191965 A1 | 9/2005 | Yu et al. | |
| 2007/0104166 A1 * | 5/2007 | Rahman et al. | 370/338 |

FOREIGN PATENT DOCUMENTS

| | | |
|---|---|---|
| CN | 1 662 097 | 8/2005 |
| EP | 1 569 492 | 8/2005 |
| JP | 2001-345755 | 12/2001 |
| JP | 2005-244991 | 9/2005 |
| WO | WO 2006/036089 | 4/2006 |

* cited by examiner

Primary Examiner — Kent Chang
Assistant Examiner — San Htun
(74) Attorney, Agent, or Firm — The Farrell Law Firm, P.C.

(57) ABSTRACT

Disclosed is an apparatus and a method for radio connection setup in a mobile communication system. In the method, a UE reports mobility information to a network, and the network performs according to the mobility information of the UE. Therefore, it is possible to reduce complexity of the UE and reduce the waste in power consumption thereof, and reduce the signaling overhead of the network, thereby achieving efficient use of resources.

25 Claims, 8 Drawing Sheets

METHOD AND APPARATUS FOR RADIO CONNECTION SETUP IN A MOBILE COMMUNICATION SYSTEM

PRIORITY

This application claims priority under 35 U.S.C. §119(a) to an application entitled "Method And Apparatus For Radio Connection Setup In A Mobile Communication System" filed in the Korean Industrial Property Office on Apr. 25, 2006 and assigned Ser. No. 2006-37153, the contents of which are hereby incorporated by reference.

BACKGROUND OF THE INVENTION

1. Field of the Invention

The present invention relates to a mobile communication system, and more particularly to a method and an apparatus for radio connection setup in order to achieve efficient radio resource management in a mobile communication system.

2. Description of the Related Art

In general, wireless communication systems can be classified according to their multiplexing schemes, which include a time division multiplexing scheme, a code division multiplexing scheme, an orthogonal frequency multiplexing scheme, etc. Among those schemes, the code division multiplexing scheme is now most widely used and can be divided into a synchronous scheme and an a synchronous scheme. Because the code division multiplexing scheme uses codes, the code division multiplexing scheme is now short of resources due to the lack of orthogonal codes. Therefore, an Orthogonal Frequency Division Multiplexing (OFDM) scheme is now drawing a lot of attention.

The OFDM scheme, which transmits data using multiple carriers, is a special type of a Multiple Carrier Modulation (MCM) scheme in which a serial symbol sequence is converted into parallel symbol sequences and the parallel symbol sequences are modulated with a plurality of mutually orthogonal sub-carriers (sub-carrier channels) before being transmitted. The OFDM scheme is similar to the conventional Frequency Division Multiplexing (FDM) scheme. However, the OFDM scheme transmits multiple sub-carriers while maintaining the orthogonality between them, and uses the frequency spectrum in an overlapping manner. Therefore, the OFDM scheme is more efficient in its use of frequency resources, is more robust against frequency selective fading, and can reduce inter-symbol interference (ISI) by using guard intervals. Further, the OFDM scheme enables design of an equalizer having a simple hardware structure, and is robust against impulse noise. Therefore, the OFDM scheme can achieve an optimum transmission efficiency for high speed data transmission.

In the wireless communication system as described above, degradation in the quality of a high quality data service is caused mainly by the channel environment. The channel environment in the wireless communication system frequently changes due to interference by multi-path signals or other users, Doppler Effect movement and frequency speed change of a User Equipment (UE), shadowing, change in the power of a received signal caused by fading as well as Additive White Gaussian Noise (AWGN), etc. Therefore, in order to support a high quality data service in the wireless communication, it is necessary to effectively overcome such degradation factors.

One of the main schemes used in order to overcome fading in a typical OFDM system is the Adaptive Modulation and Coding (AMC) scheme. According to the AMC scheme, the modulation scheme and the coding scheme are adaptively controlled according to a channel change in a downlink (DL). Usually, it is possible to detect Channel Quality Information (CQI) of the downlink by measuring a Signal to Noise Ratio (SNR) of a received signal in a UE. The UE feedbacks the channel quality information of the downlink to a network through an uplink (UL).

The network estimates a channel state of the downlink based on the channel quality information of the downlink fed back from the UE, and determines a modulation scheme and a coding scheme in accordance with the estimated channel state. According to the AMC technology, a high-order modulation scheme and a high coding rate are applied in a good channel state, while a low-order modulation scheme and a low coding rate are applied in a bad channel state. In comparison with the conventional schemes relying on high speed power control, the AMC scheme can improve the average capability of a system by enhancing the system's capability of adapting itself to temporally changeable characteristics of a channel.

FIGS. 1A and 1B are a block diagram illustrating a structure of a typical $3^{rd}$ Generation Partnership Project (3GPP) Long Term Evolution (LTE) system, which is a next generation mobile communication system capable of replacing the Universal Mobile Telecommunication System (UMTS), and which is a standard for the $3^{rd}$ generation mobile communication currently being discussed in the 3GPP.

Referring to FIG 1A, the 3GPP LTE system includes a UE 11 for an LTE system and an Evolved Radio Access Network (E-RAN) 14, which performs functions of both a node B and a Radio Network Controller (RNC) in an existing 3GPP system. In an existing 3GPP system, a node B is a radio network apparatus which performs by itself communication with UEs and controls a cell, and an RNC controls multiple node Bs and radio resources. In the E-RAN 14, as is in the existing 3GPP system, functions of an Evolved Node B (E-NB) 12 and an Evolved RNC (E-RNC) 13 may be either physically separately distributed to different nodes or merged within one node.

For convenience of description, the following description is based on an example in which the E-NB 12 and the E-RNC 13 have been merged within one node. However, the present invention naturally includes the case in which the E-NB 12 and the E-RNC 13 are physically distributed separately to different nodes.

The E-CN 15 may be a node in which functions of a Serving GPRS Support Node (SGSN) and a Gateway GPRS Support Node (GGSN) are merged. The E-CN 15 is located between a Packet Data Network (PDN) 16 and the E-RAN 14, allocates an IP address to the UE 11, and serves as a gateway connecting the UE 110 to a packet data network (PDN) 16. The definition and functions of the SGSN and the GGSN are based on the standard of the 3GPP and will not be described in more detail here.

Referring to FIG. 1B an Evolved UMTS Radio Access Network (E-RAN) 110 has a simple 2-node structure including Evolved Node Bs (ENBs) 120, 122, 124, 126, and 128 and anchor nodes 130 and 132. A User Equipment (UE) 101 is connected to an Internet Protocol (IP) network through the E-RAN 110. The ENBs 120 to 128 correspond to existing Node Bs of the UMTS system and are connected with the UE 101 through radio channels. Differently from the existing Node Bs, the ENBs 120 to 128 perform more complicated functions. In the LTE system, all user traffic, including a real time service such as Voice over IP (VoIP) through an Internet Protocol, are provided through shared channels. Therefore, the LTE system requires units for collecting and scheduling state information of the UEs. Such operations are performed by the ENBs 120 to 128.

Usually, one ENB controls a plurality of cells. Further, the ENB performs Adaptive Modulation and Coding (AMC) for determining a channel coding rate and a modulation scheme in accordance with the channel state of a UE. Further, as the Enhanced Dedicated Channel (E-DCH), High Speed Uplink Packet Access (HSUPA), and High Speed Downlink Packet Access (HSDPA) of the UMTS, Hybrid ARQ (HARQ) is performed between the ENBs 120 to 128 and the UE 101 in the LTE also. However, only HARQ is insufficient in order to satisfy the requirement for diverse Qualities of Service (QoSs). Therefore, separate ARQ (outer ARQ) in a higher layer may be performed between the UE 101 and the ENBs 120 to 128.

HARQ is a transmission scheme for improving a ratio of success in packet reception by soft-combining previously-received data with retransmitted data without discarding the previously-received data. HARQ is used in order to improve the transmission efficiency in high speed packet communication such as High Speed Downlink Packet Access (HSDPA), Enhanced Dedicated Channel (EDCH), etc. It is expected that, in order to achieve a transmission speed of maximum 100 Mbps, the LTE should use the Orthogonal Frequency Division Multiplexing (OFDM) as wireless access technology in the 20 MHz bandwidth.

Current 3GPP standard organizations are discussing statuses or modes of UEs in a 3GPP LTE system, which can be classified into an RRC idle mode and an RRC connected mode. The RRC is a layer located on a control plane of the E-RAN and the UE, which transmits/receives radio access-related control information through the RRC layer. The RRC idle mode refers to a mode of the UE, in which the E-RAN does not have RRC context information about the UE and there exists no control channel (RRC connection) between the UE and the E-RAN. In contrast, the RRC connected mode refers to a mode of the UE, in which a control channel (RRC connection) exists between the UE and the E-RAN and the E-RAN has RRC context information about the UE.

FIG. 2 is a signal flow diagram illustrating an example of a conventional RRC connection establishing procedure and procedures that can be performed thereafter by a UE.

Referring to FIG. 2, a UE 201 is initially in an RRC idle mode in step 211. When there is a request for a signaling connection to the E-RAN 202 or an E-CN (not shown) from a higher layer in the RRC idle mode, an RRC connection is established between the UE 201 and the E-RAN 202 through the RRC connection setup process of steps 221 to 223. A control channel through which RRC control information, etc. can be transmitted is established between the UE 201 and the E-RAN 202, and the E-RAN 202 can maintain/manage a context for the UE 201.

In step 221, the UE 201 transmits an RRC connection request message requesting the RRC connection. In step 222, in response to the RRC connection request message of step 221, the E-RAN 202 transmits an RRC connection setup message including control channel information for the UE 201. The RRC connection setup message may include resource allocation information for reporting CQI to be performed by the UE, measurement control information, uplink timing sync procedure information, etc.

The resource allocation information for reporting CQI may include radio resource information in the time and frequency domain, a start point, a period, etc. The measurement control information may include a list of neighbor cells and parameters requiring measurement within frequency/between frequencies/between systems, gap generation information for measurement between frequencies/between systems, etc. The uplink timing sync procedure information may include a period of the uplink timing synchronization to be performed, etc. The information as described above may either be included in the transmitted RRC connection setup message as in step 222 or be transmitted through separate signaling as in steps 231 to 233. The E-RAN 202 may transmit resource allocation information for reporting CQI to the UE 201 as in step 231, or may transmit measurement control information to the UE 201 as in step 232, or may transmit uplink timing sync procedure information to the UE 201 as in step 233. The sequence in which the information is transmitted may be changed according to the way in which the present invention is implemented.

The RRC connection setup completion message transmitted in step 223 is transmitted from the UE 201 to the E-RAN 202 in order to notify that the RRC connection has been successfully competed in response to the RRC connection setup message of step 222.

The CQI reports transmitted by the UE 201 in steps 241 to 246 include the RRC connection setup message of step 222 or the resource allocation information of step 231 for reporting CQI to the UE 201, and are performed based on resources/intervals for the CQI report received through separate signaling. Through the CQI report of steps 241 to 246, the E-RAN 202 recognizes a current channel state of the UE 201 and sets an AMC level for data transmission based on the CQI report.

The uplink timing sync procedure of steps 251 and 252 includes parameter information for the uplink timing synchronization procedure of step 233 or the RRC connection setup message of step 222, and performs a periodic uplink timing sync procedure according to a period of the uplink timing synchronization procedure received through separate signaling. The uplink timing synchronization procedure of steps 251 and 252 is performed in order to acquire synchronization between a time point for uplink transmission by the UE 201 and a time point for uplink reception by the E-RAN 202 from the UE 201.

In step 261, a gap interval is generated based on gap information for measuring neighbor cells between frequencies/between systems received through separate signaling, which includes the measurement control information of step 232 or the RRC connection setup message received in step 222.

In the gap interval generated in step 261, the UE 201 interrupts channel reception from a current cell of a current frequency band and performs measurement for neighbor cells of another system or another frequency band indicated by measurement control information, and the E-RAN 202 does not perform transmission to the UE 201. The UE 201 continues to perform measurement for neighbor cells within the frequency, except for the gap interval as in step 261, based on the list of neighbor cells within the frequency received through the measurement control information.

As noted from FIG. 2, according to the prior art, the UE 201 performs, through a pre-established gap interval, measurement for neighbor cells between frequencies/between systems and measurement within frequency/between frequencies/between systems after shifting to an RRC conriected mode. Therefore, the UE 201 must perform many complicated procedures, such as a periodic CQI report using radio resources, a periodic uplink timing sync procedure using radio resources, etc., which cause many problems including excessive power consumption, complexity, etc. Further, the E-RAN 202 allocates many radio resources in order to allow the UEs to perform the measurement, CQI report, uplink timing sync procedure, etc., which result in inefficient use of radio resources.

SUMMARY OF THE INVENTION

Accordingly, the present invention has been made to solve the above-mentioned problems occurring in the prior art, and the present invention provides an apparatus and a method, by which an ARQ transmitter can predict the time that a state report will occur in a mobile communication system.

Also, the present invention provides an apparatus and a method for efficient operation of radio resources through notification of a fixed or stationary state/type of a UE at the time of a state transition from a Radio Resource Control (RRC) idle mode to an RRC connected mode in a mobile communication system.

Also, the present invention provides an apparatus and a method, which can prevent the measurement of UEs requiring no procedures at the time of a state transition from an RRC idle mode to an RRC connected mode in a mobile communication system.

In accordance with an aspect of the present invention, there is provided a method for radio connection setup in a mobile communication system, the method includes setting a mobility factor according to a mobility of a User Equipment (UE); when the mobility factor is less than a threshold, determining a mobility indicator according to the mobility factor and transmitting a connection setup request message including the mobility indicator; receiving the connection setup request message and detecting the mobility indicator included in the connection setup request message; selecting procedures for the UE by using the mobility indicator; and generating a connection setup message including information indicating the selected procedures and transmitting the connection setup message.

In accordance with another aspect of the present invention, there is provided a mobile communication system for radio connection setup between a User Equipment (UE) and a network entity, the mobile communication system includes the UE for setting a mobility factor according to a mobility of the UE, and determining a mobility indicator according to the mobility factor and transmitting a connection setup request message including the mobility indicator when the mobility factor is less than a threshold; and the network entity for receiving the connection setup request message, detecting the mobility indicator included in the connection setup request message, selecting procedures for the UE by using the mobility indicator, generating a connection setup message including information indicating the selected procedures, and transmitting the connection setup message.

In accordance with another aspect of the present invention, there is provided a method for setting radio connection to a network entity by a User Equipment (UE) in a mobile communication system, the method includes setting a mobility factor according to a mobility of the UE; when the mobility factor is less than a threshold, determining a mobility indicator according to the mobility factor; transmitting a connection setup request message including the mobility indicator; receiving a connection setup message from the network entity in response to the connection setup request message; and performing procedures according to the connection setup message.

In accordance with another aspect of the present invention, there is provided a method for setting radio connection to a User Equipment (UE) by a network entity a in a mobile communication system, the method includes receiving a connection setup request message and detecting a mobility indicator included in the connection setup request message; selecting procedures for the UE by using the mobility indicator; and generating a connection setup message including information indicating the selected procedures and transmitting the connection setup message.

In accordance with another aspect of the present invention, there is provided a User Equipment (UE) for setting radio connection to a network entity in a mobile communication system, the UE includes a measurement unit for determining a mobility of the UE and setting a mobility factor; a determination unit for determining the mobility indicator according to the mobility factor when the mobility factor has a value less than a predetermined threshold; a message setup unit for generating a connection setup request message including the mobility indicator; and a message transceiver for transmitting the connection setup request message and receiving the connection setup message.

In accordance with another aspect of the present invention, there is provided a network apparatus for setting radio connection to a User Equipment (UE) in a mobile communication system, the network apparatus includes a message transceiver for receiving the connection setup request message and transmitting the connection setup message; a detector for detecting a mobility indicator from the received connection setup request message; and a controller for selecting procedures for the UE by using the mobility indicator and generating the connection setup message including information about the selected procedures.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted when it may make the subject matter of the present invention rather unclear. Further, various definitions found in the following description are provided only to help in the general understanding of the present invention, and it will be apparent to those skilled in the art that the present invention can be implemented without such definitions.

According to the present invention, if a UE is a fixed or a stationary type UE (hereinafter, referred to as "stationary UE"), the UE reports that information to the E-RAN through an initial uplink message requesting an RRC connection setup so that the E-RAN can recognize the stationary state of the UE. When the UE is a stationary UE, the E-RAN need not measure neighbor cells between frequencies/between systems. Moreover, when the current cell is in a good channel condition, the E-RAN need not measure even neighbor cells within the frequency. Further, because the UE is stationary within the cell, it is unnecessary to periodically acquire an uplink timing synchronization as long as the cell is not changed, and it is possible to regard the channel state as being relatively stable and omit a short periodical CQI report.

When recognizing that the UE is a stationary UE, the E-RAN can determine procedures that can be omitted, which the UE does not require, by taking into account a channel state, radio resources, etc. of a current cell of the UE.

In order to determine if the UE is a stationary UE, it is possible to use a mobility factor according to the mobility of a UE. When the mobility factor has a value less than a threshold, it is determined that the UE is a stationary UE. For example, in the case of using a Global Positioning System (GPS), it is possible to set a mobility factor according to an average speed of a UE during a predetermined time interval. It is also possible to set a mobility factor according to a standard deviation of an average value of a downlink pilot channel measured during a predetermined time interval. It is also possible to set a mobility factor according to the number of times by which a UE has changed the cell during a predetermined time interval. It is also possible to set a mobility factor by using measurement through a particular application layer, measurement through an interface with a user, measurement according to device type or class of a UE, etc. The present invention is not limited to the method of determining if a UE is a stationary UE, and can employ another method as well as the methods described above.

Figure 1A:
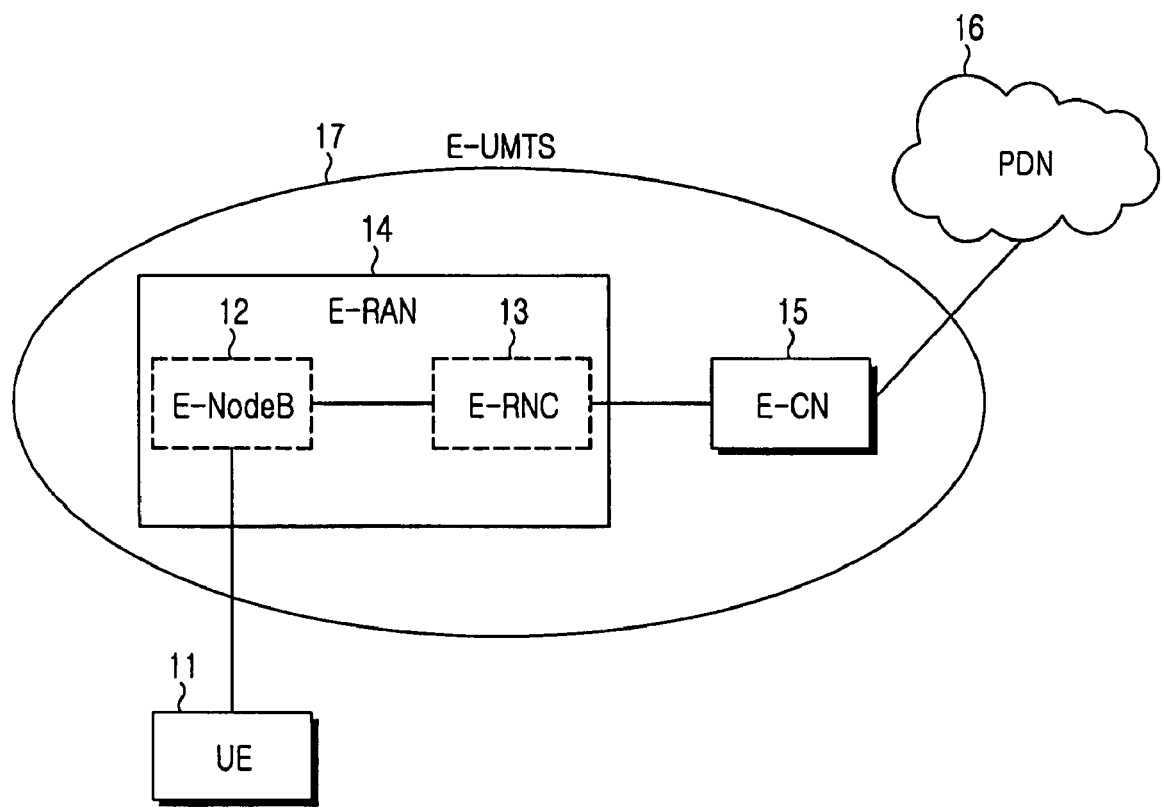
FIGS. 1A and 1B are a block diagram illustrating a structure of a typical 3GPP LTE system.
Figure 1B:
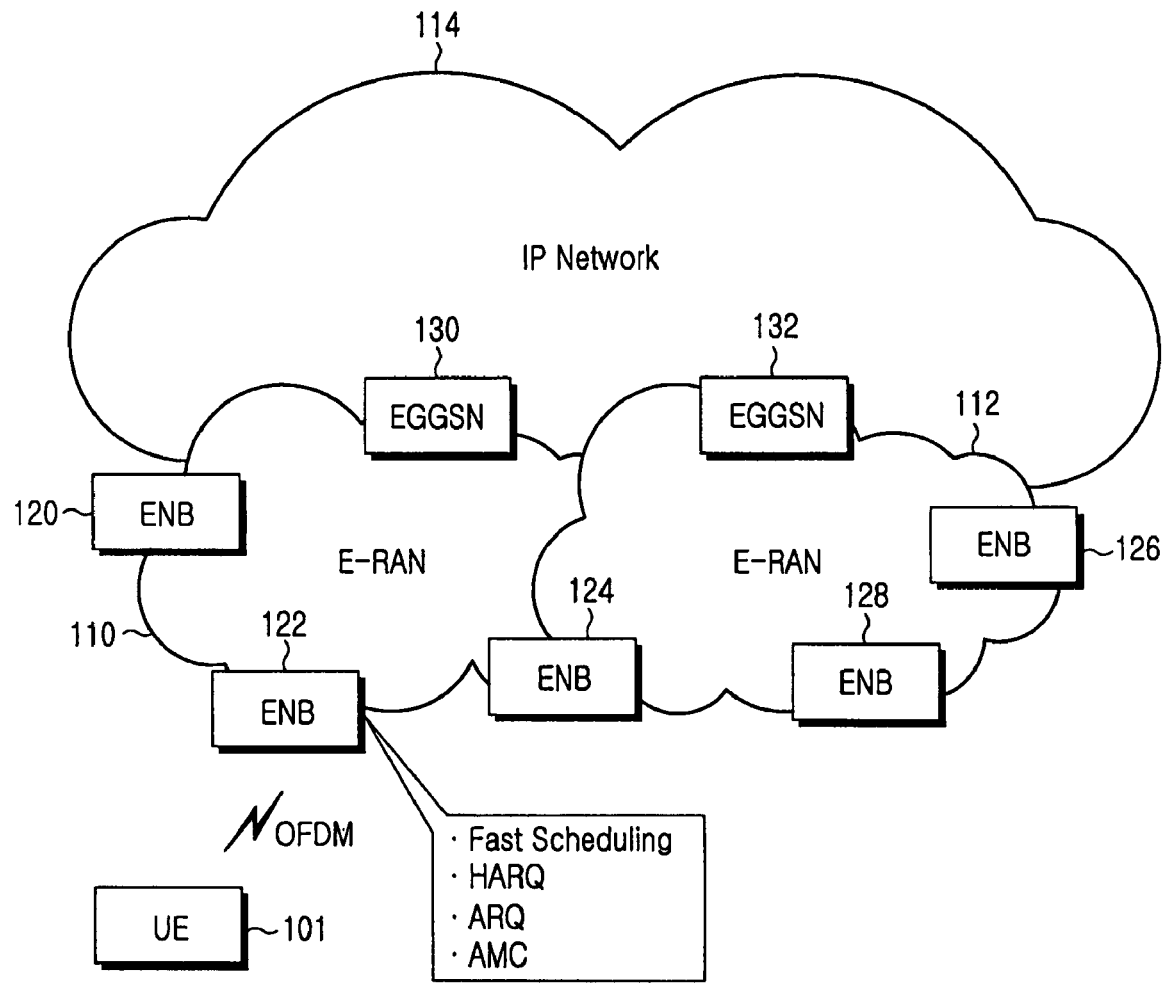
Figure 2:
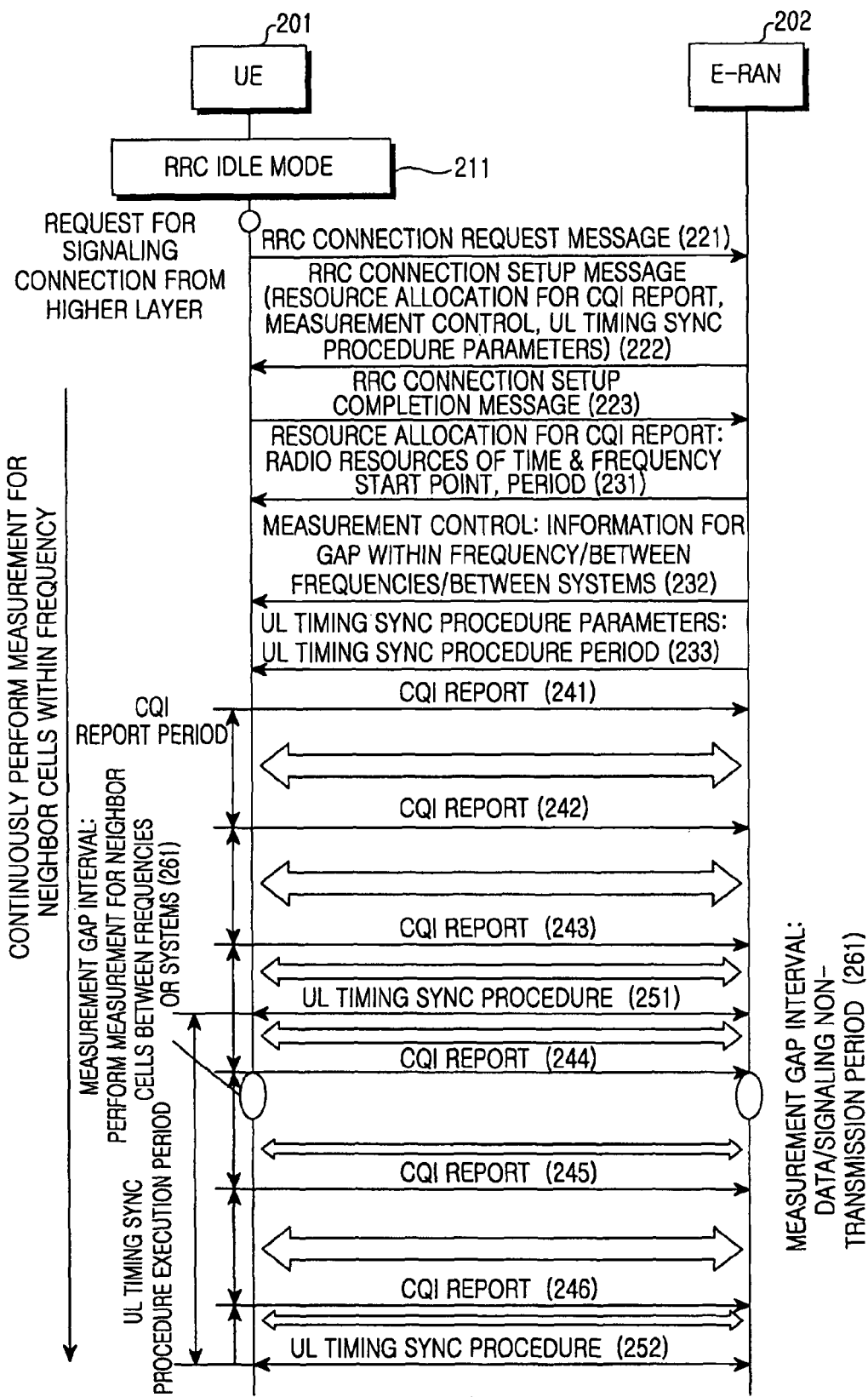
FIG. 2 is a signal flow diagram illustrating an example of a conventional RRC connection establishing procedure and procedures that can be performed thereafter.
Figure 3:
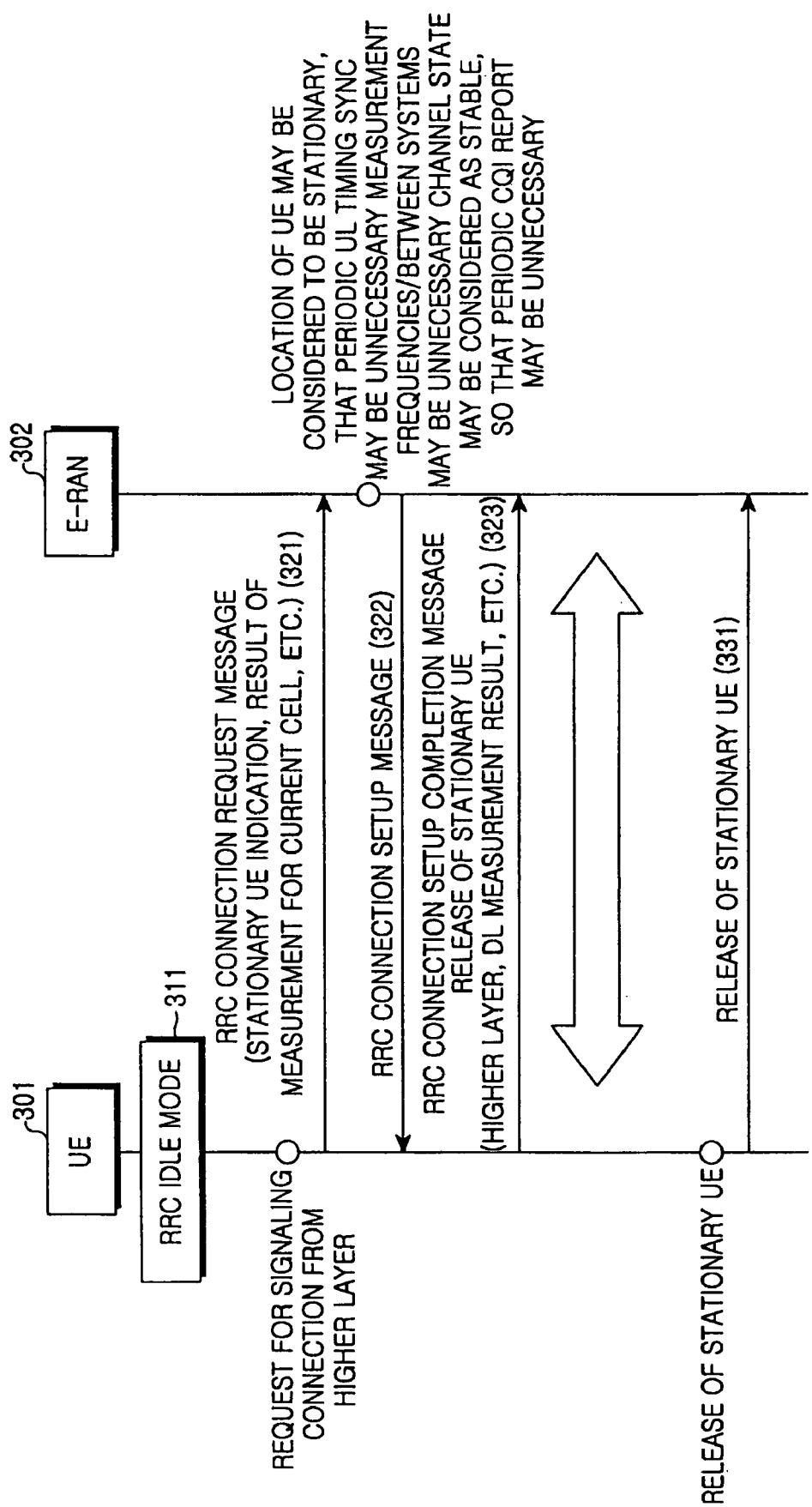
FIG. 3 is a signal flow diagram illustrating a radio resource management procedure in an RRC connection setup process according to an embodiment of the present invention.

FIG. 3 is a signal flow diagram illustrating a radio resource management procedure in an RRC connection setup process according to an embodiment of the present invention.

Referring to FIG. 3, a UE 301 is initially in an RRC idle mode in step 311. When there is a request for a signaling connection to the E-RAN 302 or an E-CN (not shown) from a higher layer in the RRC idle mode, an RRC connection is established between the UE 301 and the E-RAN 302 through the RRC connection setup process of steps 321 to 323. A control channel through which RRC control information, etc. can be transmitted is established between the UE 301 and the E-RAN 302, and the E-RAN 302 can maintain/manage context for the UE 301.

Specifically, in step 321, the UE 301 transmits an RRC connection request message requesting the RRC connection, which contains information (stationary UE indication) that the UE 301 is a stationary UE. The RRC connection request message may further include a resultant value of measurement for the current cell. In step 322, in response to the RRC connection request message, the E-RAN 302 transmits an RRC connection setup message including control channel information for the UE 301.

The RRC connection setup message does not include information which indicates resource allocation information for a CQI report for the UE 301, measurement control information, and uplink timing sync procedure information, because the E-RAN 302 determines that those procedures are unnecessary for the stationary UEs. The E-RAN 302 recognizes that the UE is a stationary UE, and may include some of the information mentioned above in the RRC connection setup message, for execution of some of the above procedures in consideration of a channel state of the current cell and radio resources of the current cell.

When a result of measurement for the current cell shows a high value (that is, when the current cell is in a very good channel condition), the E-RAN 302 having received the RRC connection request message determines that it is unnecessary to periodically perform the uplink timing synchronization procedure because the UE is stationary within a cell, or determines that it is unnecessary to perform measurement of neighbor cells within frequency/between frequencies/between systems because the UIE is stationary within a cell and the cell is in a very good channel condition, or determines that a (short) periodic CQI report for the UE is unnecessary based on the assumption that the channel environment is generally will maintained.

Therefore, in this case also, the E-RAN 302 need not transmit the uplink timing synchronization procedure information, resource allocation information for the CQI report, measurement control information, etc. to the UE 301 through separate signaling or the RRC connection setup message of step 322.

Because the UE 301 need not perform the periodic uplink timing synchronization procedure, the (short) periodic CQI report, and measurement of neighbor cells within frequency/between frequencies/between systems as described above, it is possible to simplify the operation of the UE 301 and to reduce the power consumption of the UE 301. Further, the E-RAN 302 can allocate radio resources, which should otherwise have been allocated to the above-mentioned procedures, to other users or for another signaling/data transmission, thereby achieving efficient use of radio resources. Moreover, the E-RAN 302 need not arrange a gap for the measurement of neighbor cells between frequencies/between systems. It is possible to achieve flexibility in the scheduling and to reduce delay in the signaling/data transmission.

When the UE 301 is not a stationary UE, the UE 301 transmits that information to the E-RAN 302 in step 331.

Figure 4:
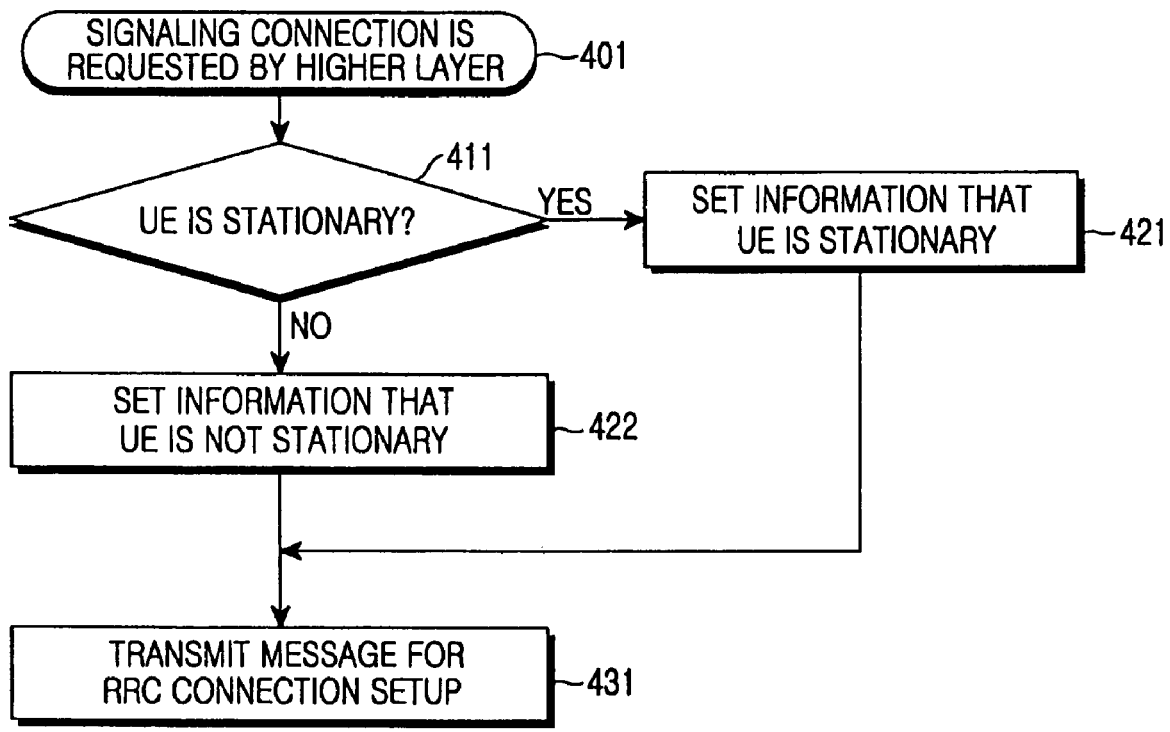
FIG. 4 is a flow diagram illustrating an operation of a UE according to an embodiment of the present invention.

FIG. 4 is a flow diagram illustrating an operation of a UE according to an embodiment of the present invention.

Referring to FIG. 4, when the UE receives a request for signaling connection from a higher layer in an RRC idle mode in step 401, the UE checks the state of the UE itself in step 411. When the UE is a stationary UE, the UE proceeds to step 421 in which the UE sets information notifying that the UE is a stationary UE. When the UE is not a stationary UE, the UE proceeds to step 422 in which the UE sets information notifying that the UE is not a stationary UE. Thereafter, in step 431, the UE transmits an initial uplink message for the RRC connection setting, which includes the information set in step 421 or 422, to the E-RAN.

Figure 5:
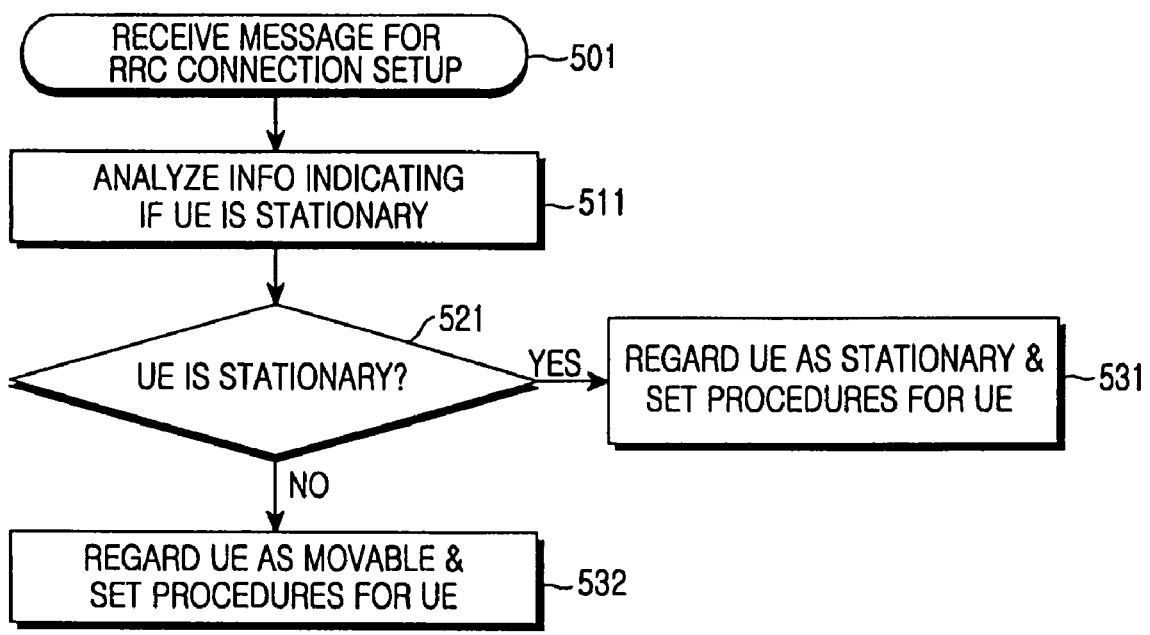
FIG. 5 is a flow diagram illustrating an operation of a radio access network according to an embodiment of the present invention.

FIG. 5 is a flow diagram illustrating an operation of a radio access network according to an embodiment of the present invention.

Referring to FIG. 5, the E-RAN receives an initial uplink message for RRC connection setup from the UE in step 501, and reads and analyzes the UE state information included in the received initial uplink message for RRC connection setup in step 511. The E-RAN determines the state of the UE based on a result of the analysis in step 521. As a result of the determination, when the UE is a stationary UE, the E-RAN proceeds to step 531 in which the E-RAN sets proper procedures for the stationary UE. The proper procedures may be determined based on not only the information that the UE is a stationary UE, but also can be based on a channel state of a current cell of the UE, a state of radio resources within the cell, etc.

The embodiment shown in FIG. 5 is based on an assumption that a current cell of the UE is in a good channel condition and there are insufficient radio resources within the available cell, so that the E-RAN does not perform all measurements of the neighbor cells within frequency/between frequencies/between systems, a (short) periodic CQI report, and periodic uplink timing sync procedures. However, it is possible to selectively transmit only predetermined information instead of omitting transmission of all information to the UE.

As a result of the determination in step 521, when the UE is not a stationary UE, the E-RAN proceeds to step 532, in which the E-RAN sets proper procedures for the UE which is not a stationary UE. For example, the E-RAN may transmit a message including all of measurement of neighbor cells within frequency/between frequencies/between systems, a (short) periodic CQI report, and periodic uplink timing sync procedures to the UE.

Figure 6:
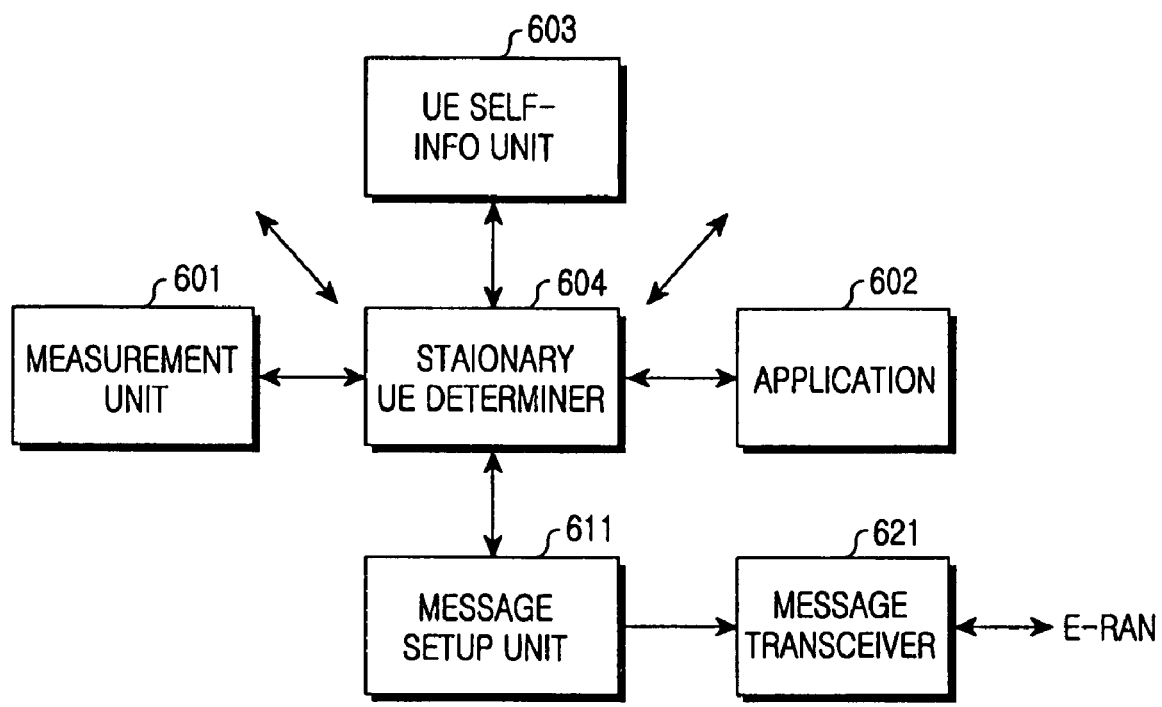
FIG. 6 is a block diagram illustrating a structure of a UE according to an embodiment of the present invention.

FIG. 6 is a block diagram illustrating a structure of a UE according to an embodiment of the present invention.

Referring to FIG. 6, by using a Global Positioning System (GPS), a measurement unit 601 sets a mobility factor according to an average speed of a UE during a predetermined time interval, according to a standard deviation of an average value of downlink pilot channels measured during a predetermined time interval, or according to the number of times by which a UE has changed the cell during a predetermined time interval. Then, the measurement unit 601 transfers the set mobility factor to a stationary UE determiner 604.

A specific application 602, which is an application for determining if the UE is a stationary UE, sets a mobility factor according to mobility of the UE through a particular application and transfers the set mobility factor to a stationary UE determiner 604.

A UE self-information unit 603 is a block for managing UE self-information context. The UE self-information unit 603 transfers a mobility factor according to self-information of the UE to the stationary UE determiner 604.

The measurement unit 601, the application 602, and the UE self-information unit 603 are examples of elements of a method for determining if the UE is a stationary UE, and the present invention is not limited to a particular method in determining if the UE is a stationary UE.

When the mobility factor received from the measurement unit 601, the application 602, or the UE self-information unit 603 has a value less than a predetermined threshold, the stationary UE determiner 604 determines that the UE is a stationary UE and transmits a mobility indicator according to the mobility factor to a message setup unit 611. Then, the message setup unit 611 generates an initial uplink message for RRC connection setup including the mobility indicator.

A message transceiver 621 transmits the message generated by the message setup unit 611 to the E-RAN, and receives a downlink response message from the E-RAN.

Figure 7:
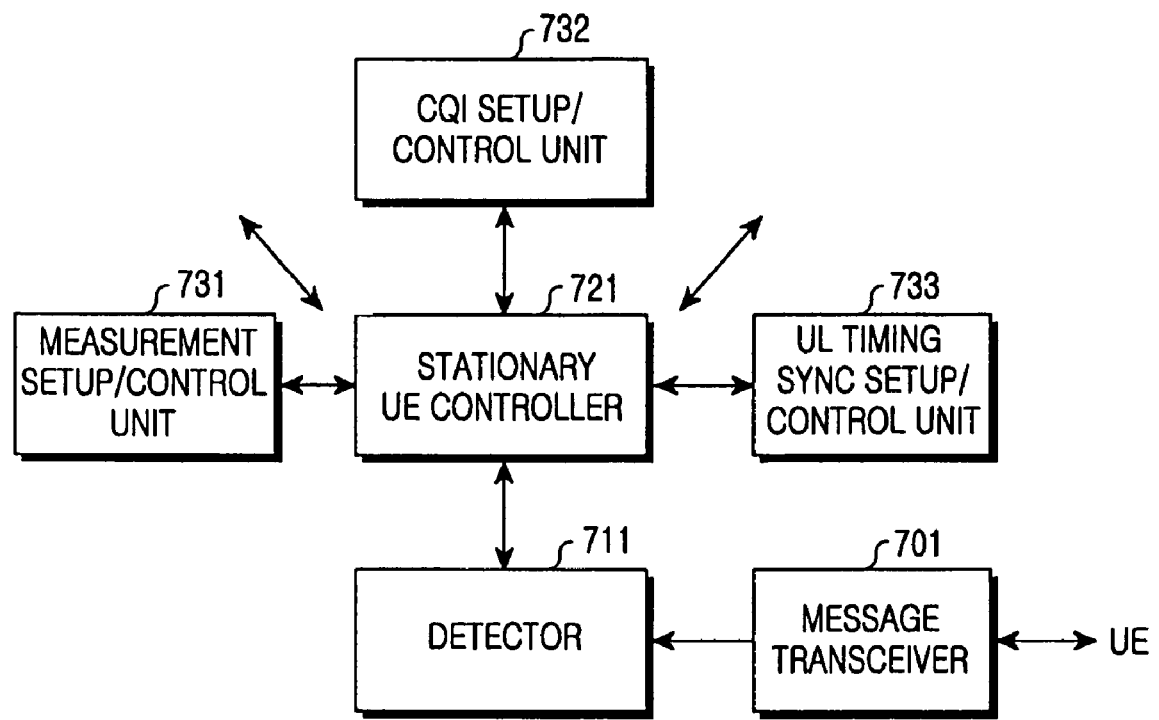
FIG. 7 is a block diagram illustrating a structure of a radio access network according to an embodiment of the present invention.

FIG. 7 is a block diagram illustrating a structure of a radio access network according to an embodiment of the present invention.

Referring to FIG. 7, a message transceiver 701 receives a message from the UE and transmits a message to the UE, and the initial uplink message for the RRC connection setup process received through the message transceiver 701 is transferred to a detector 711. The detector 711 detects the mobility indicator from the initial uplink message and transfers the mobility indicator to a stationary UE controller 721. If the initial uplink message includes the mobility indicator, the stationary UE controller 721 sets or controls procedures for the stationary UE. Examples of such procedures includes a measurement setup/control unit 731 for setting measurement control information of the UE, a CQI setup/control unit 732 for allocating resource information for CQI report of the UE, and a UL setup/control unit 733 for setting uplink timing sync procedure information of the UE. The procedures described above are only examples of the present invention, and the present invention is not limited to those procedures and includes other procedures.

In a mobile communication system according to the present invention, mobility information of a UE is notified to a radio access network when the UE shifts from an RRC idle mode to an RRC connected mode. As a result, the radio access network needs to perform only the optimized procedures without the need to perform unnecessary procedures, based on the state of the UE, thereby reducing the complexity of the UE and waste of power. Further, the present invention can reduce signaling overhead of the network, thereby achieving efficient use of resources.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for radio connection setup in a mobile communication system, the method comprising the steps of:
   setting a mobility factor according to a mobility of a User Equipment (UE);
   when the mobility factor is less than a threshold, determining a mobility indicator according to the mobility factor and transmitting a connection setup request message that includes the mobility indicator;
   receiving the connection setup request message and detecting the mobility indicator included in the connection setup request message;
   selecting procedures for the UE by using the mobility indicator; and
   generating a connection setup message that includes information indicating the selected procedures and transmitting the connection setup message.

2. The method as claimed in claim 1, wherein, when the mobility factor is 0, the mobility indicator has a value representing that the UE is stationary.

3. The method as claimed in claim 1, wherein the connection setup request message further comprises channel state information or radio resource information of a current cell in which the UE is currently located, and the step of selecting procedures for the UE select the procedures by using the information of the connection setup request message.

4. The method as claimed in claim 1, wherein the mobility factor is set according to a number of times which the UE has performed cell change during a predetermined time interval.

5. The method as claimed in claim 1, wherein the mobility factor is set according to a standard deviation of an average value of a measured downlink pilot channel during a predetermined time interval.

6. The method as claimed in claim 1, wherein the mobility factor is set according to a standard deviation of an average speed of the UE during a predetermined time interval by using a Global Positioning System (GPS).

7. The method as claimed in claim 1, wherein the mobility factor is set according to information input by a user or through a predetermined application.

8. The method as claimed in claim 1, wherein the information of the connection setup message do not include the information which indicates at least one of resource allocation information for a channel quality information report, measurement control information, and uplink timing sync procedure information.

9. A mobile communication system for radio connection setup between a User Equipment (UE) and a network entity, the mobile communication system comprising:
the UE for setting a mobility factor according to a mobility of the UE, and determining a mobility indicator according to the mobility factor and transmitting a connection setup request message that includes the mobility indicator when the mobility factor is less than a threshold; and
the network entity for receiving the connection setup request message, detecting the mobility indicator included in the connection setup request message, selecting procedures for the UE by using the mobility indicator, generating a connection setup message that includes information indicating the selected procedures, and transmitting the connection setup message.

10. The mobile communication system as claimed in claim 9, wherein the UE determines the mobility indicator to have a value representing that the UE is stationary when the mobility factor is 0.

11. The mobile communication system as claimed in claim 9, wherein the information of the connection setup message do not include the information which indicates at least one of resource allocation information for a channel quality information report, measurement control information, and uplink timing sync procedure information.

12. The mobile communication system as claimed in claim 9, wherein the UE comprises:
a measurement unit for setting the mobility factor;
a determination unit for determining the mobility indicator according to the mobility factor;
a message setup unit for generating the connection setup request message; and
a message transceiver for transmitting the connection setup request message and receiving the connection setup message.

13. The mobile communication system as claimed in claim 12, wherein the connection setup request message generated by the message setup unit includes channel state information or radio resource information of a current cell in which the UE is currently located, and the network entity selects the procedures by using the information of the connection setup request message.

14. The mobile communication system as claimed in claim 12, wherein the measurement unit sets the mobility factor according to one of a number of times which the UE has performed a cell change during a predetermined time interval, a standard deviation of an average value of a downlink pilot channel measured during a predetermined time interval, and an average speed of the UE measured during a predetermined time interval by using a Global Positioning System (GPS).

15. The mobile communication system as claimed in claim 9, wherein the network entity comprises:
a message transceiver for receiving the connection setup request message and transmitting the connection setup message;
a detector for detecting the mobility indicator from the received connection setup request message; and
a controller for selecting procedures for the UE by using the mobility indicator and generating the connection setup message including information about the selected procedures.

16. A method for setting radio connection to a network entity by a User Equipment (UE) in a mobile communication system, the method comprising the steps of:
setting a mobility factor according to a mobility of the UE;
when the mobility factor is less than a threshold, determining a mobility indicator according to the mobility factor;
transmitting a connection setup request message including the mobility indicator;
receiving a connection setup message from the network entity in response to the connection setup request message; and
performing procedures according to the connection setup message.

17. The method as claimed in claim 16, wherein, when the mobility factor is 0, the mobility indicator has a value representing that the UE is stationary.

18. The method as claimed in claim 16, wherein the mobility factor is set according to a number of times which the UE has performed cell change during a predetermined time interval.

19. The method as claimed in claim 16, wherein the mobility factor is set according to a standard deviation of an average value of a measured downlink pilot channel during a predetermined time interval.

20. The method as claimed in claim 16, wherein the mobility factor is set according to a standard deviation of an average speed of the UE during a predetermined time interval by using a Global Positioning System (GPS).

21. The method as claimed in claim 16, wherein the mobility factor is set according to information input by a user or through a predetermined application.

22. The method as claimed in claim 16, wherein information of the connection setup message does not include information that indicates at least one of resource allocation information for a channel quality information report, measurement control information, and uplink timing sync procedure information.

23. A User Equipment (UE) for setting radio connection to a network entity in a mobile communication system, the UE comprising:
a measurement unit for determining a mobility of the UE and setting a mobility factor;
a determination unit for determining the mobility indicator by using the mobility factor when the mobility factor has a value less than a predetermined threshold;
a message setup unit for generating a connection setup request message including the mobility indicator; and
a message transceiver for transmitting the connection setup request message and receiving the connection setup message.

24. The mobile communication system as claimed in claim 23, wherein the connection setup request message generated by the message setup unit includes channel state information or radio resource information of a current cell in which the UE is currently located, and the network entity selects procedures by using information of the connection setup request message.

25. The mobile communication system as claimed in claim 23, wherein the measurement unit sets the mobility factor according to one of a number of times which the UE has performed a cell change during a predetermined time interval, a standard deviation of an average value of a downlink pilot channel measured during a predetermined time interval, and an average speed of the UE measured during a predetermined time interval by using a Global Positioning System (GPS).

* * * * *